May 7, 1957  L. BEEMAN  2,791,658
PRESSURE SWITCHES
Filed Aug. 21, 1953  3 Sheets-Sheet 1

INVENTOR
LYLE BEEMAN
BY Ralph Brown
ATTORNEY

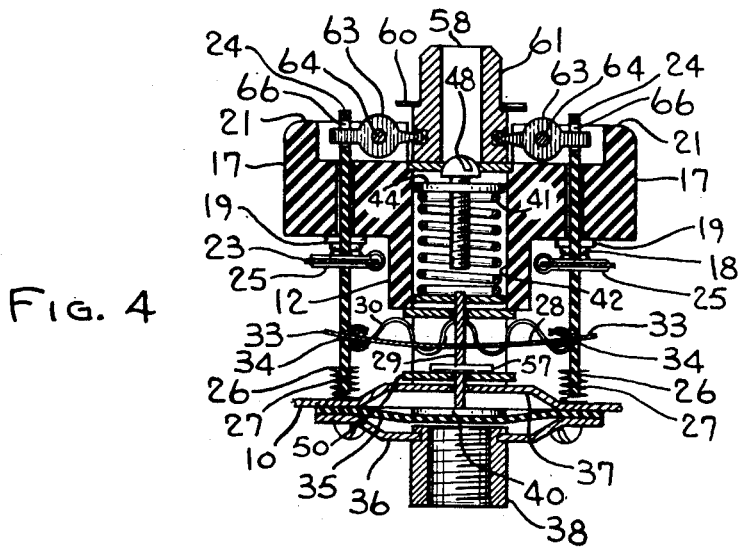
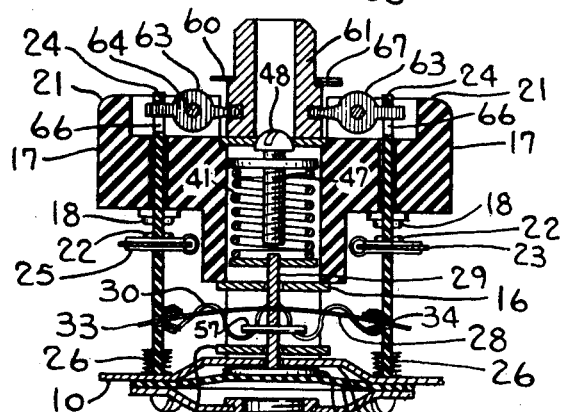
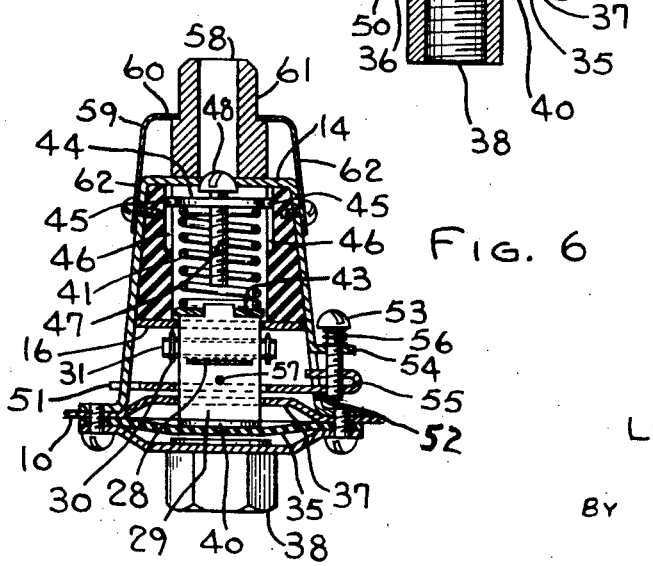

May 7, 1957  L. BEEMAN  2,791,658
PRESSURE SWITCHES
Filed Aug. 21, 1953  3 Sheets-Sheet 3

INVENTOR
LYLE BEEMAN
BY
ATTORNEY

United States Patent Office 2,791,658

Patented May 7, 1957

2,791,658

PRESSURE SWITCHES

Lyle Beeman, Dayton, Ohio

Application August 21, 1953, Serial No. 375,738

11 Claims. (Cl. 200—83)

This invention relates to pressure switches.

This application is a continuation in part of my co-pending application, Serial No. 234,269, filed June 29, 1951, now Patent No. 2,754,388, disclosing an improved pressure switch involving the use of a pressure responsive, switch actuating, snap action element arranged for simplicity and economy in structure, precision and certainty in operation and long life.

One object of the present invention is to further improve the construction and operation of pressure switches of the kind therein disclosed.

A more specific object is to increase the power capacity and life of the snap action element.

Another object is to insure that adequate pressure is maintained between the closed switch contacts until switch-opening action of the snap action element has been initiated. This is accomplished by the provision of means for yieldably resisting or retarding the opening of the switch until the snap action element has passed through its unstable dead center position preparatory to its switch opening action.

Another object is to provide in a pressure switch simple and improved means for regulating the pressure differential, that is to say, for varying the difference between the maximum and minimum fluid pressures for which the switch is set.

Another object is to eliminate the tendency of the switch contacts to stick together and to thereby insure a prompt and quick opening action of the switch as required.

Another object is to provide, in a condition sensitive switch, means for placing the same under automatic or manual control, alternatively, as desired.

Other more specific objects and advantages will appear, expressed or implied, from the following description of a pressure switch constructed in accordance with this invention.

In the accompanying drawings:

Fig. 4 is a vertical sectional view taken along the line 4—4 of Fig. 2 showing the switch in closed position.

Fig. 5 is a view similar to Fig. 4 showing the switch in open position.

Fig. 6 is a vertical sectional view taken along the line 6—6 of Fig. 1.

Figure 1:
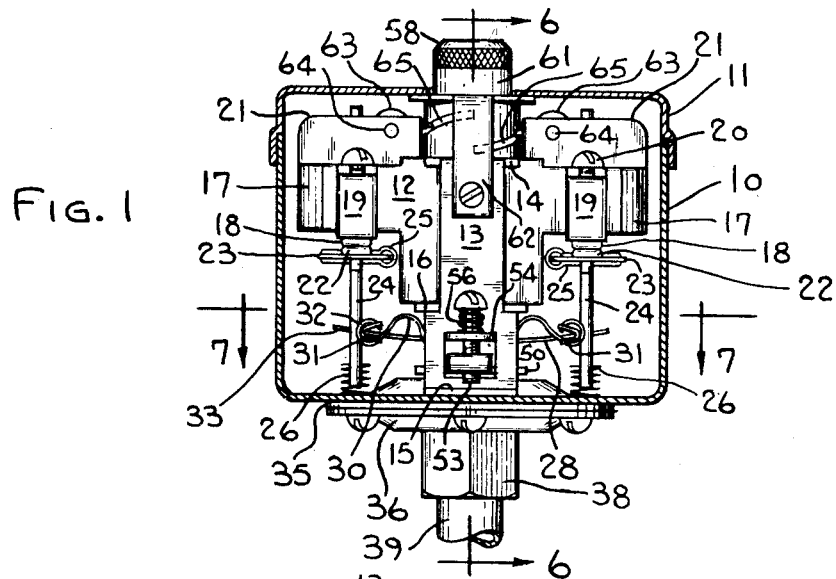
Figure 1 is a view in front elevation of a pressure switch embodying the present invention with the housing thereof shown in section.
Figure 2:
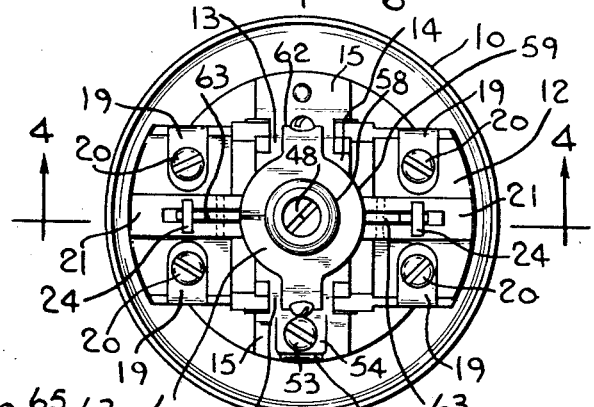
Fig. 2 is a top plan view thereof.

The pressure switch selected for illustration is shown contained in a cup-shaped housing 10 having a removable cover 11. A terminal block 12 of insulating material arranged in the upper part of the housing is supported by a suitable bracket. The bracket shown comprises a metal strap bent to closely embrace the block 12 and to form a pair of supporting legs 13, an upper connector section 14, and mounting feet 15, the latter being secured to the bottom of the housing. A cross piece 16 interlocked with the legs 13 and bearing against the base of block 12 secures the block in position.

Figure 3:
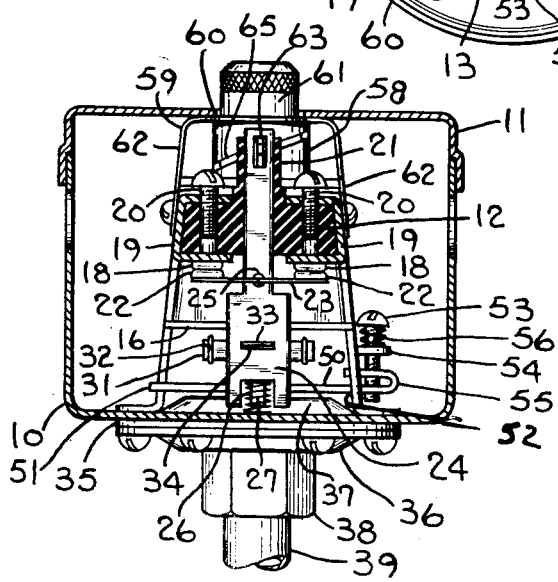
Fig. 3 is a side elevation partly in section.
Figure 8:
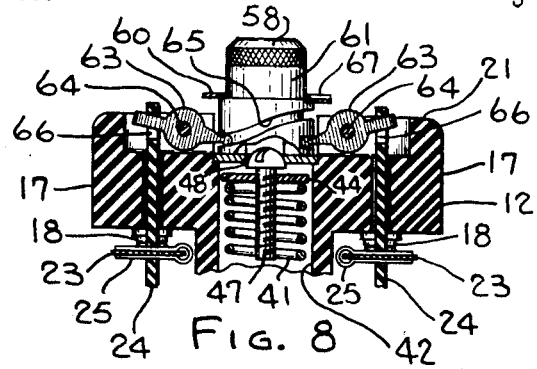
Fig. 8 is a fragmentary sectional view showing the switch locked closed.
Figure 9:
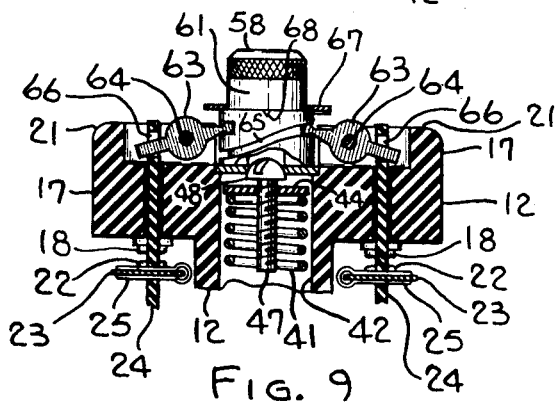
Fig. 9 is a similar view showing the switch locked open.
Figure 7:
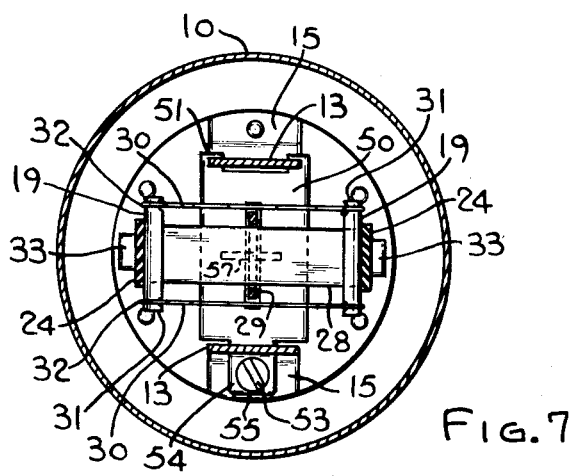
Fig. 7 is a horizontal sectional view taken along the line 7—7 of Fig. 1.

The block 12 in this instance includes a pair of laterally projecting portions 17 each supporting a pair of stationary switch contacts 18 therebeneath. As indicated particularly in Fig. 3, the contacts 18 are carried by separate U-shaped conductor members 19 embracing opposite sides of each portion 17, each conductor being retained by a screw 20 threaded through an end thereof and extending downward into the portion 17. These screws constitute binding posts conveniently located at the top of the block 12 and effectively separated by a barrier rib 21 extending lengthwise of each portion 17.

A pair of movable switch contacts 22 are disposed below each portion 17 for coaction with the stationary contacts 18 just described. In this instance each pair of movable contacts 22 are fixed to opposite ends of a bridging conductor 23 carried by a substantially rigid vertically movable actuating strip 24 of insulating material. Each bridge member 23 is suitably slotted to loosely receive the strip 24 and a cotter pin 25 projecting through the strip 24 and embracing the member 23 supports the latter. The pin 25 traverses the member 23 at a mid-point thereof and provides a horizontal pivot or fulcrum therefor operable to equalize the contact pressures between each pair of contacts when the switch is closed.

Both of the switch actuating strips 24 are shown projecting upwardly through and guided by the block 12 with the lower end of each terminating adjacent the bottom of the housing 10. Each strip 24 is urged upwardly toward switch closing position by suitable means such as rather light compression spring 26 seated on the bottom of the housing and reacting upwardly against the lower end of the strip. As indicated particularly in Fig. 3, the lower end of each strip 24 is preferably slotted to receive the spring 26 and to provide a centering tongue 27 engaged within the spring to position the same.

Both strips 24 are automatically actuated and controlled to effect simultaneous opening or closing of the several switches preferably by a pressure responsive snap action element such as will now be described. The snap action element shown comprises a flexible resilient leaf spring 28 of one or more plies horizontally disposed below the block 12. In this instance, the spring 28 extends loosely through a centrally disposed vertical thrust element 29 for support at a mid-point thereby, each end of the spring being interlocked with one of the strips 24. A pair of tension springs 30 disposed at opposite sides of the spring 28 and extending lengthwise thereof react on the latter in a manner to cause the same to assume a bowed condition such as indicated. In this instance, each end of the leaf spring 28 is rockably seated within a longitudinally grooved shoe 31 traversing the spring and projecting beyond the side edges thereof. Each shoe shown is formed of sheet metal bent into V-form, the projecting ends thereof being appropriately notched to receive and interlock with the hooked ends 32 of the springs 30. These shoes 31 thus function as retainers for the tension springs 30 and as thrust sustaining elements through which the pull of the springs 30 is transmitted to the ends of the leaf spring 28 to subject the same to longitudinal compression. A narrow extension 33 at each end of the leaf spring 28 projects loosely through the adjacent shoe 31 and into interlocking engagement within a suitable slot 34 provided in the adjacent switch actuating strip 24.

The arrangement is such that with the leaf spring 28 in the bowed condition shown in Fig. 4 and with the several movable switch contacts 22 thereby held against the fixed contacts 18, an upward movement of the thrust element 29 will elevate the center of the leaf spring 28 until the latter passes through an unstable dead center position whereupon it snaps into the condition of reverse curvature shown in Fig. 5, the ends thereof reacting on the strips 24 in a direction to withdraw the several contacts 22 from contacts 18 to open the switches. And as a result of a downward movement of the thrust element 29 from the elevated position of Fig. 5 with a consequent lowering of the center of the leaf spring, the latter ultimately reassumes the bowed condition of Fig. 4 with a snap action, the ends 33 thereof reacting on and through the strips 24 to promptly close the several contacts 22 against the contacts 18.

A rather common difficulty in switches having contacts of the character above described is that, under some conditions of use there is a tendency for them to stick together and thus objectionably impede or seriously impair the switch opening action. In the device shown provision is made for eliminating this difficulty. For this purpose each of the contact supporting bridge members 23 hereinabove described is a flexible resilient strip designed to bow or arch slightly under the upward centrally applied thrust of the connected actuating strip 24 as the latter forces the movable contacts 22 closed against the contacts 18. This bowing action of a bridge member 23 imparts a slight rocking and wiping action to the connected movable contacts 22 against the stationary contacts which in itself is sufficient to discourage sticking.

Since the extent and direction of this flexing or bowing action varies with the magnitude and direction of the thrust of the strips 24, a further rocking and wiping action of the contacts 23 occurs during the downward switch-opening pull of the strips 24. This positively frees the contacts from each other.

Furthermore, the vertical depth of the slot 34 in each strip 24 is preferably slightly extended so as to provide a substantial vertical play of the end extension 33 therein, whereby, when the ends of the leaf spring 28 snap toward the switch-opening position, each delivers a hammer blow to the associated strip 24 to further insure prompt withdrawal of contacts 22 from contacts 18.

Provision is also made for maintaining adequate pressures between the several switch contacts until they are separated by the snap action of the leaf spring 28. In this instance the compression springs 26 react through the strips 24 for this purpose, while the above noted play of the spring extensions 33 in the slots 34 of the strips 24 assures that the desired pressures between contacts remain undisturbed until after the leaf spring 28 has passed through the critical dead center position and until the ultimate switch-opening snap action of this spring has been initiated.

In the device shown the thrust element 29 is actuated by a pressure responsive flexible diaphragm 35 securely clamped along its margin by and between a dished disk 36 and an oppositely dished portion 37 of the bottom of the housing 10. A suitable hollow fitting 38 depending from the disk 36 is internally threaded to receive a pressure transmitting pipe 39 by which the housing 10 is supported.

The thrust element 29 rests upon a suitable button 40 attached to the diaphragm 35 centrally thereof. The element 29 extends upwardly through and is guided by the dished portion 37 of the housing bottom and the cross piece 16 hereinabove mentioned. A vertical compression spring 41 is contained in a cylindrical opening 42 provided centrally of the block 12. The spring 41 is confined between a lower retainer disk 43 seated on the upper end of the element 29 and an upper retainer disk 44 having ears 45 guided in opposed vertical guide slots 46 formed in the wall of the opening 42 as indicated in Fig. 6. A screw 47 threaded in the disk 44 and having a head 48 seated against the periphery of a perforation in the upper section 14 of the block supporting bracket hereinabove described.

The spring 41 yieldably opposes the upward movement of the thrust element 29 induced by the fluid pressure transmitted to the diaphragm 35 through the pipe 39, and by adjustment of the screw 47 the spring 41 may be adjusted to thereby regulate the fluid pressure at which the switch will open.

Provision is made for independently regulating the fluid pressure at which the switch will close. In the device shown this is accomplished by the use of a lever 50 rockably supported at one end 51 by a loose interlocking engagement with one of the bracket legs 13 and extending loosely through an opening 52 in the other leg 13. A screw 53 extending loosely through a lug 54 projecting from said other leg 13, is threaded in the free end 55 of the lever 50 to support the same. The screw 53 is yieldably sustained by a spring 56 confined between the lug 54 and the head of the screw. The lever 50 is suitably slotted to accommodate the thrust element 29 which extends upwardly therethrough. A stop 57 in the form of a pin extending transversely through the element 29 is positioned to come into engagement with the lever 50 at a predetermined point in the downward movement of said element from its upper switch-opening position to thereby depress the lever 50 against the resistance of spring 56.

The lever 50 and spring 56 are thus ultimately brought into play to yieldably oppose the spring 41 and thus retard the continued downward movement of the thrust element 29, so that the latter does not reach its lower switch-closing position until the fluid pressure against the diaphragm 35 has reduced to a value below that at which the switch-closing action would otherwise occur. The spring 56 may be adjusted by rotation of the screw 53 to thereby vary the pressure at which the switch-closing action will occur.

It will be noted that the movement of the lever 50 is limited, so that during upward movement of the thrust element 29, resulting from increasing pressure against the diaphragm 35, the pin 57 rises clear of the lever 50 before the thrust element 29 reaches its upper switch-opening position. Consequently, the element 29 is uninfluenced by the lever 50 or spring 56 when switch-opening occurs, so that adjustment of the spring 56 to determine the value of the fluid pressure at which switch-closing occurs, in no way affects the value of the fluid pressure at which switch-opening occurs, the latter being determined solely by adjustment of the spring 41. Adjustment of the spring 56 is thus effective to regulate the difference between the switch-opening and switch-closing pressures.

In the device shown provision is made for placing the switches under manual control to the exclusion of the above described automatic pressure responsive control, when desired. The mechanism shown for this purpose includes a substantially cylindrical control element 58 rotatably seated on the block 12 midway between the switch actuating strips 24. The element 58 is retained on its seat by a thin strip 59 of steel fashioned to provide an intermediate ring portion 60 adapted to snugly embrace a reduced upward extension 61 of the element 58 and to seat on a resulting shoulder at the base of the extension 61. A pair of tabs 62 extending downwardly from diametrically opposite sides of the ring portion 60 are shown attached to the bracket legs 13 hereinabove referred to. The reduced extension 61 of the element 58 projects upwardly through the housing cover 11 and is thus exposed for ready manipulation. The element 58 has a central opening therethrough affording convenient access to the screw 48 for adjustment by a screw driver or the like.

Figure 10:
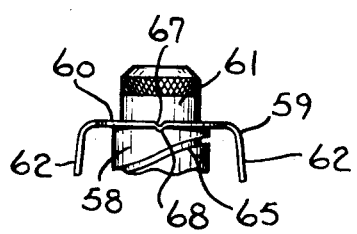
Fig. 10 is a detail view of a manual control knob.
Figure 11:
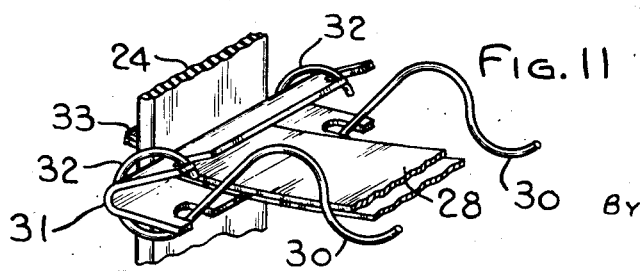
Fig. 11 is an enlarged detail view of a spring retainer shoe.

In this instance the barrier rib 21 at the top of the block 12 is longitudinally slotted to accommodate a pair of levers 63 at opposite sides of the element 58, each lever 63 being rockably supported intermediate its ends on a pin 64 fixed in the rib 21. The inner end of each lever 63 is engaged in a helical cam slot 65 formed in the periphery of the element 58, while the other end of each is engaged in a vertically extended slot 66 formed in the adjacent switch actuating strip 24. The slots 66 are of such length that, when the element 58 is in a neutral rotative position, the switch actuating strips 24 are free to move in response to automatic action of the leaf spring 28 without interference by the levers 63. The element 58 is yieldably retained in this neutral position by suitable means such as a detent 67 formed on the ring 60 and engageable with a notch 68 in the shoulder of the element 58, as shown particularly in Fig. 10.

The arrangement is such that, by rotating the element 58 in one direction from the neutral position just described, both levers 63 may be simultaneously actuated by the cam slots 65 to depress both strips 24 and to thereby open the switches and lock the same in open position. Similarly, by rotating the element 58 in the opposite direction, both strips 24 may be simultaneously actuated to elevate the same and to thereby close the switches and lock the same closed.

Various changes may be made in the embodiment of the invention hereinabove specifically described without departing from or sacrificing the advantages of the invention as defined in the appended claims.

I claim:

1. In a pressure switch the combination of a leaf spring, a pair of shoes respectively seated on and carried by the opposite ends of said spring, longitudinally resilient tension means connecting said shoes and acting therethrough to longitudinally compress and bow said spring, pressure responsive means operable on an intermediate portions of said spring to flex the same and thereby cause the same to snap into a reversely bowed position, and switch means connected to the ends of said spring and responsive to snap action flexing thereof.

2. In a pressure switch the combination of a leaf spring, a pair of shoes respectively seated on and carried by the opposite ends of said spring, longitudinally resilient tension means connecting said shoes and acting therethrough to longitudinally compress and bow said spring, pressure responsive means operable to flex said spring and thereby cause the latter to snap into a reversely bowed position, and switch means responsive to snap action movements of said spring.

3. In a switch the combination of a leaf spring having movable ends, a pair of shoes respectively seated on and carried by said ends of said spring, longitudinally resilient tension means connecting said shoes and operable therethrough to longitudinally compress and bow said spring, switch means actuated by said spring ends and effective to limit the movement of the latter, and a movable element engaged with an intermediate portion of said spring and cooperating with said switch means to flex said spring and thereby cause the same to snap into a reversely bowed position, whereby snap action movement is imparted to said switch means by said spring ends.

4. In a device of the character described the combination of a leaf spring having movable ends, a pair of shoes respectively seated on and carried by said ends of said spring, longitudinally resilient tension means connecting said shoes and operable therethrough to longitudinally compress and bow said spring, means actuated by said spring ends and effective to limit the movement thereof, and a movable element operable on said spring intermediate the ends thereof and cooperating with said last named means to flex said spring and thereby cause the latter to snap into a reversely bowed position, whereby snap action movement is imparted to said last named means by said spring ends.

5. A snap action element for the purpose described comprising a leaf spring having movable ends, a pair of shoes respectively seated on and carried by said ends of said spring, longitudinally resilient tension means connecting said shoes and operable therethrough to longitudinally compress and bow said spring, whereby transverse flexing of said spring will cause the latter to snap into a reversely bowed position.

6. A snap action element for the purpose described comprising a leaf spring, a pair of shoes in which the opposite ends of said spring are respectively rockably seated, and longitudinally resilient tension means carried by and connecting said shoes and operable therethrough to longitudinally compress and bow said spring, whereby said spring will snap into a reversely bowed position upon flexing the same.

7. A snap action element for the purpose described comprising a leaf spring, a pair of shoes in which the opposite ends of said springs are respectively rockably seated, said shoes extending laterally beyond said spring, and longitudinally resilient tension devices disposed at opposite sides of said spring and connected to the projecting ends of said shoes, said devices acting through said shoes to longitudinally compress and bow said spring.

8. A snap action element for the purpose described comprising a leaf spring, a pair of shoes respectively carried by the opposite ends of said spring and extending crosswise thereof, each of said shoes being grooved to rockably receive one of said spring ends, and longitudinally resilient means having end portions respectively engaged with said shoes and operable therethrough to longitudinally compress and bow said spring, whereby said resilient means is effective to reversely bow said spring with a snap action in response to transverse flexing of said spring.

9. A snap action element for the purpose described comprising a leaf spring, a pair of shoes respectively carried by the ends of said spring, each of said shoes extending laterally beyond the sides of said spring and grooved to rockably receive one of said spring ends, and a pair of substantially parallel longitudinally resilient tension members connecting said shoes and operable thereon to longitudinally compress and bow said spring, each of said members having end portions respectively engaged with corresponding projecting ends of said shoes.

10. In a switch mechanism the combination of a switch, a snap action element operable to open and close said switch, condition responsive means for effecting snap action movements of said element to automatically open and close said switch, and manual means for opening and closing said switch independently of said snap action element, said last named means including means for locking said switch in open or closed position.

11. In a switch mechanism the combination of a switch, actuating means therefor, a snap action element operable on said actuating means to open and close said switch, condition responsive means for effecting snap action movements of said element to automatically control said switch, and manually actuated means for controlling said switch to the exclusion of said snap action element.

References Cited in the file of this patent

UNITED STATES PATENTS

| | | |
|---|---|---|
| 1,085,920 | Knaak | Feb. 3, 1914 |
| 1,688,866 | Hansen | Oct. 23, 1928 |
| 1,700,842 | Gordon | Feb. 5, 1929 |
| 1,985,337 | Bondurant | Dec. 25, 1934 |

(Other references on following page)

UNITED STATES PATENTS

| | | |
|---|---|---|
| 2,013,435 | Dobler et al. | Sept. 3, 1935 |
| 2,040,181 | Mekelburg | May 12, 1936 |
| 2,281,544 | Beeman et al. | May 5, 1942 |
| 2,328,154 | Lennholm | Aug. 31, 1943 |
| 2,343,060 | Horning | Feb. 29, 1944 |
| 2,360,666 | Fish | Oct. 17, 1944 |
| 2,462,244 | Wise | Feb. 22, 1949 |
| 2,598,536 | Hansen | May 27, 1952 |
| 2,754,388 | Beeman | July 10, 1956 |

FOREIGN PATENTS

| | | |
|---|---|---|
| 546,135 | Great Britain | June 29, 1942 |
| 696,816 | Great Britain | Sept. 9, 1953 |
| 726,902 | Great Britain | Mar. 23, 1955 |